United States Patent [19]

Paynter et al.

[11] 4,046,673

[45] Sept. 6, 1977

[54] SIMPLIFIED REGENERATION PROCEDURE

[75] Inventors: John D. Paynter; Beverly B. Fuqua, both of Baton Rouge, La.; Richard R. Cecil, Mendham, N.J.

[73] Assignee: Exxon Research and Engineering Company, Linden, N.J.

[21] Appl. No.: 613,242

[22] Filed: Sept. 15, 1975

Related U.S. Application Data

[63] Continuation-in-part of Ser. No. 388,745, Aug. 16, 1973, abandoned.

[51] Int. Cl.$^2$ .................... C10G 35/08; B01J 11/18
[52] U.S. Cl. .................... 208/140; 252/415; 208/139
[58] Field of Search ............... 208/140, 139; 252/415

[56] References Cited

U.S. PATENT DOCUMENTS

| | | | |
|---|---|---|---|
| 2,916,440 | 12/1959 | Hogin et al. | 208/140 |
| 3,117,076 | 1/1964 | Brennan et al. | 208/140 |
| 3,278,419 | 10/1966 | Coe et al. | 208/140 |
| 3,418,256 | 12/1968 | Rigney et al. | 252/415 |
| 3,537,980 | 11/1970 | Kluksdahl | 252/415 |
| 3,622,520 | 11/1971 | Hayes | 252/415 |
| 3,904,510 | 9/1975 | Sinfelt et al. | 208/140 |
| 3,939,061 | 2/1976 | Paynter et al. | 208/140 |
| 3,939,062 | 2/1976 | Sinfelt et al. | 208/140 |

*Primary Examiner*—Delbert E. Gantz
*Assistant Examiner*—James W. Hellwege
*Attorney, Agent, or Firm*—John W. Ditsler

[57] ABSTRACT

Supported iridium-containing hydrocarbon conversion catalysts which are at least partially deactivated due to the deposition of carbonaceous residues thereon during contact with hydrocarbons are regenerated by contacting the residue-containing catalyst, prior to contact with oxygen at elevated temperature, with a chlorine-containing reagent to increase the catalyst chlorine content to a level in the range of from about 0.7 to 2.0 wt. %, based on anhydrous, carbonaceous residue-free catalyst, and thereafter contacting the catalyst with a substantially sulfur-free gaseous mixture containing oxygen at a temperature varying from about 775° to 900° F. for a time sufficient to burn at least a portion of the carbonaceous residue from the catalyst while maintaining at least 0.7 wt. % chlorine on the catalyst during contact with said gaseous mixture.

19 Claims, No Drawings

SIMPLIFIED REGENERATION PROCEDURE

CROSS REFERENCE TO RELATED CASES

This is a continuation-in-part of application Ser. No. 388,745, filed Aug. 16, 1973, now abandoned.

BACKGROUND OF THE INVENTION

1. Field of the Invention

The present invention relates to a method for regenerating supported iridium-containing hydrocarbon conversion catalysts. In particular, the present invention relates to a process for the controlled regeneration of a supported iridium-containing hydrocarbon conversion catalyst that has been deactivated by the deposition of carbonaceous residues thereon during contact with a hydrocarbon feed stock at elevated temperatures.

2. Description of the Prior Art

The deactivation of noble metal-containing hydrocarbon conversion catalysts, due to the deposition of carbonaceous residues thereon drug use, is a well known phenomenon. Catalyst deactivation is particularly acute with respect to supported noble metal containing catalysts used in the hydroforming of naphtha feed stocks.

Noble metal containing reforming catalysts, in particular platinum-containing catalysts, have traditionally been arranged by burning the coke or carbonaceous residues from the catalyst followed by a redispersion operation whereby the platinum contained on the catalyst, which is agglomerated with loss of surface area during the burning operation, is redispersed by treatment with chlorine or other halogen providing reagents, alone or in combination with oxygen, at elevated temperatures. The relatively simple techniques employed for the redispersion of platinum are not directly applicable for the residpersion of iridium. One of the reasons for this fact is that unprotected iridium tends to agglomerate to low surfce area iridium metal and/or iridium oxide crystallites when exposed to halogen-free, oxygen at elevated temperatures. Procedures have been developed for the facile redispersion of iridium following a carbonaceous residue burning operation. However, conducting the redispersion operation is relatively time consuming and increases the amount of time that a commercial unit is not in use.

SUMMARY OF THE INVENTION

In accordance with the present invention, it has been discovered that the time consuming redispersion operations need to redisperse iridium contained on a supported hydrocarbon conversion catalyst can be substantially avoided by conducting the preliminary carbonaceous residue burning operation in such a manner that the iridium present on the catalyst is not substantially agglomerated, that is, less than 20 wt. %, preferably less than 10 wt. % of the total iridium on the catalyst is converted during a single burning operation of iridium-metal and/or iridium oxide agglomerates having crystallite sizes greater than about 50 Angstroms (length of a side of an assumed cubic crystallite).

The regeneration sequence of the present invention comprises the steps of (1) contacting the carbonaceous residue containing catalyst, after being contacted with hydrocarbon feed stock (during or after such contact) but prior to contact with oxygen at a temperature greater than about 775° F., with a chlorine-containing reagent in amounts sufficient to increase the catalyst chlorine content to a level in the range of from about 0.7 to 2.0 wt. %, based on anhydrous, carbonaceous residue-free catalyst, (2) contacting the chlorine-treated, carbonaceous residue containing catalyst with a substantially sulfur-free gaseous mixture containing oxygen at a maximum temperature varying from about 775° to 900° F. for a time sufficient to burn at least a portion of the carbonaceous residues from the catalyst, while maintaining at least 0.7 wt. % chlorine on the catalyst, and (3) contacting the carbonaceous residue-depleted catalyst from step 2, prior to contact with an oxygen-containing gas, at a temperature in excess of about 900° F., with the process feed stock at hydrocarbon conversion conditions.

In a particularly preferred operation, the regeneration procedure comprises the sequentially conducted steps of (1) contacting a totally or partially deactivated iridium-containing catalyst during or immediately following hydrocarbon conversion operations with a chlorine-containing reagent in amounts sufficient to increase the catalyst chlorine content to a level in the range of from about 0.7, preferably from about 0.8, to 2.0 wt. %, based on anhydrous, carbonaceous residue-free catalyst, (2) purging the catalyst with an inert gas to remove hydrocarbons from the reaction zone containing the catalyst, (3) contacting the chlorine-treated catalyst with a substantially sulfur-free gaseous mixture containing minor quantities of oxygen at a maximum temperature in the range of from about 775°, to 900° F. for a time sufficient to burn at least a portion of the carbonaceous residues from the catalyst while maintaining at least 0.7 wt. % chlorine on the catalyst and (4) returning the catalyst to service without subsequent contacting of the carbonaceous residue-depleted catalyst with an oxygen-containing gas at a temperature in excess of the maximum temperature (normally the burn flame front temperature) employed during the operation to burn carbonaceous residues from the catalyst.

The carbonaceous residue removal process of the present invention differs from procedures typically employed with platinum-based hydrocarbon conversion catalysts. Typically, procedures developed for use in regenerating platinum catalyst such as those disclosed in U.S. Pat. Nos. 3,201,355; 3,278,419; 3,622,520 and 3,673,109 are characterized by the use of burning operations conducted at temperatures well in excess of the temperatures employed in the process of the present invention. Such elevated temperature contacting would serve to damage seriously the iridium-containing catalyst by the formation of iridium metal and/or iridium oxide agglomerates of reduced surface area.

The supported iridium-containing catalyst composites that are regenerated by the process of the present invention comprise a porous carrier or support material in combination with an iridium component and, for certain uses, a halogen component. The support component of the catalyst is preferably a porous, adsorptive material having a surface area, as determined by the Brunauer-Emmett-Teller (BET) method, of about 20 to 800, preferably 100 – 300 square meter per gram. This support material should be substantially refractory at the temperature and pressure conditions utilized in any given hydrocarbon conversion process. Useful support material include: (a) silicon-based materials such as silica or silica gel, silicon carbide, clays, natural or synthetic silicates such as kieselguhr, kaolin, china clay, Attapulgus clay.; (b) aluminosiliate zeolite materials such as naturally occurring or synthetic erionite, mordenite, faujsite, etc. that may or may not be previously converted to a hydrogen or ammonia form and reduced in soda content by virtue of an exchange reaction with various metal cations, including rare earth metal cations; (c) refractory inorganic oxides, including alumina, titanium dioxide, zinc oxide, magnesia, thoria, chromia, silica-alumina, alumina-titania, silica-zirconia, alumina-chromia, etc. and (d) mixtures of one or more of the materials referred to above.

Refractory inorganic oxide materials are preferred catalyst support materials. In general, superior results are obtained when alumina, in particular the gamma or eta forms, is employed. Alumina is the preferred catalyst support material when the catalyst is employed in naphtha reforming operations. The support materials described above are known articles of commerce and can be prepared for use as catalyst constituents by many varied techniques. Typically, the support materials are prepared in the form of spheres, granules, powders, extrudates or pellets. The precise size or shape of the support material used in dependent upon many engineering factors not within the purview of the instant invention.

As noted above, the regeneration process of the instant invention is particularly adapted to the treatment of deactivated iridium-containing cataysts. Iridium may be the sole catalyst metal present on the support; however, iridium may also be used in combination with other Group VIII metals or metals from Groups IB, VIA or VIIA of the Periodic Table of the Elements. More specifically, the iridium may be used in conjunction with one or more additional catalyst metals selected from copper, silver, gold, iron, cobalt, nickel, tungsten, molybdenum, chromium, platinum, palladium, rhodium, ruthenium, osmium, manganese or rhenium. The catalysts may also contain germanium, tin or lead. Particularly effective naphtha reforming catalysts are combinations of iridium and platinum. Most preferably, the catalyst metals are present in the form of highly dispersed clusters of atoms of said metals.

Certain minimum amounts of iridium, alone or in combination with additional catalyst metals, should be present on the catalyst. This is particularly true with respect to catalysts employed in a naphtha reforming operation where the catalyst should contain greater than about 0.1 wt. % iridium, based upon the dry weight of the total catalyst. For other types of operations, lesser quantities of iridium may be employed. Specifically, iridium may be present on the catalyst in amounts varying from about 0.01 to bout 3.0 wt. %, preferably in amounts varying from greater than about 0.1 to about 1.0 wt. %, based upon the total weight of the dry catalyst. Typically, any additional catalyst metals, such as platinum, are present in the catalyst in amounts varying from about 0.01 to 3.0 wt. %, preferably 0.1 to 1.0 wt. %, based upon the dry weight of the catalyst. Iridium/platinum naphtha reforming catalyst having maximum effectiveness normally contain 0.15 to 1.0 wt. % each, preferably about 0.15 to 0.5 wt. % each, of iridium and platinum, based on total catalyst.

Iridium-containing catalysts may be prepared employing siple impregnation techniques. Such a catalyst may be prepared by impregnating a support material with a solution of a soluble iridium compound and soluble compounds of any additional metals to be incorporated in the catalyst. Generally, an aqueous solution of the metal compounds is used. In the use of multimetallic systems, the support material may be impregnated with the various metal-containing compounds either sequentially or simultaneously. However, it is highly desirable that the metal compounds, in the case of a polymetallic system, be impregnated on the catalyst support simultaneously to maximize the desired interaction between the metal compounds and thereby promote the formation of a highly dispersed polymetallic cluster structure in the final reduced form the catalyst. The carrier material is impregnated with solutions of appropriate concentration to provide the desired quantity of metal in the finished catalyst. In the case of iridium-containing catalysts, compounds suitable for the impregnation of iridium onto the carrier include, among others, chloroiridic acid, iridium tribromide, iridium trichloride, and ammonium chloriridiate. Additional catalyst metals may be incorporated onto the support by employing compounds such as chloroplatinic acid, ammonium chloroplatinate, platinum amine salts, perrhenic acid, ruthenium trichloride, rhodium trichloride, rhodium nitrate, palladium chloride, palladium amines alts, osmium trichloride, chloroosmic acid, auric chloride, chloroauric acid, silver nitrate, copper nitrate, copper chloride, ferric nitrate, cobalt nitrate, nickel nitrate, etc. The preferred catalyst manufacturing technique involves contacting a previously prepared support, such as alumina, with an aqueous solution of an iridium compound, alone or in a combination with a compound of at least one additional catalyst metal.

After impregnation of the carrier, the composite catalyst is dried at a temperature varying from about 220° to 250° F. The catalyst may be dried in air at the above stated temperatures or may be dried by treating the catalyst in a flowing stream of inert gas or hydrogen. The drying step may be followed by an additional calcination step at temperatures of about 500° – 700° F. Care must be taken to avoid contacting the catalyst at temperatures in excess of about 775° – 800° F. with air or other gases of high oxygen concentration. If the catalyst is contacted with oxygen at too high a temperature, at least a portion of the iridium present will be oxidized, with loss of surface area, to crystallites of iridium oxide. in the case of polymetallic systems, the desired polymetallic cluster structure will not be obtained on reduction.

Additional materials may be added to the iridium-containing catalyst composite to assits in the promotion of various types of hydrocarbon conversion reactions for which the catalyst might be employed. For example, the naphtha reforming activity of the catalyst is enhanced markedly by the addition of a halogen moiety, particularly a chlorine or fluorine moiety, to the catalyst. The halogen should be present in the catalyst in amounts varying from about 0.1 to about 3.0 wt. %, based on the total dry weight of the catalyst. The halogen may be incorporated into the catalyst at any suitable stage in the catalyst manufacturing operation, i.e., before, during or after incorporation of the active metal component onto the support material. Halogen is often incorporated into the catalyst by imprengating the support with halogen-bearing metal compounds such as chloroiridic acid. Further amounts of halogen may be incorporated in the catalyst by contacting it with hydrogen fluoride, ammonium fluoride, hydrogen chloride, or ammonium cloride, either prior to or subsequent to the impregnation step. Other components may also be added to the catalyst composite. For example, the catalyst may be sulfided before or during use. For certain applications other than naphtha reforming, alkali or alkaline earth metal compounds may be added to the catalyst.

The iridium-containing catalyst composites may be used to promote a wide variety of hydrocarbon conversion reactions such as hydrocracking, isomerization, dehydrogenation, hydrogenation, alkylation, polymerization, cracking, and the like. The catalysts are particularly useful in promoting the dehydrogenation, isomerization, dehydrocyclization and hydrocracking reactions that occur in a naphtha hydroforming process.

In a naphtha hydroforming process (reforming) a substantially sulfur-free naphtha stream that typically contains about 15 to 80 volume % paraffins, 15 to 80 volume % naphthenes and about 2 to 20% aromatics and boiling at atmospheric pressure substantially between about 80° and 450° F., preferably between about 150° and 375° F., is contacted with the iridium-containing catalyst composite in the presence of hydrogen. The reactions typically occur in a vapor phase at a temperature varying from about 650° to 1000° F., preferably about 750° – 980° F. Reaction zone pressures may vary from about 1 to 50, preferably from about 5 to 30 atmospheres. The naphtha feed stream is passed over the catalyst composite at space velocities varying from about 0.5 to 20 parts by weight of naphtha per hour per part by weight of catalyst (W/hr./W), preferably from about 1 to 10 W/hr./W. The hydrogen to hydrocarbon mole ratio within the reaction zone is maintained between about 0.5 to 20, preferably between about 1 and 10. During the reforming process, the hydrogen used may be in admixture with light gaseous hydrocarbons. In a typical operation, the catalyst is maintained as a fixed be within a series of adiabatically operated reactors. The product stream from each reactor (except the last) in the reactor train is reheated prior to passage to the following reactor. As an alternate to the above-described process, the catalyst may be used in a moving bed in which the naphtha charge stock, hydrogen and catalyst are passed in parallel through the reactor or in a fluidized system wherein the naphtha feed stock is passed upwardly through a turbulent bed of finely divided catalyst particles. Finally, if desired, the catalyst may be simply slurried with the charge stock and the resulting mixture conveyed to the reaction zone for further reaction.

Regardless of the hydrocarbon conversion reaction in which iridium-containing catalyst composites are employed, the catalyst tends to deactivate after use due at least in part to the formation of coke or carbonaceous residues on the surface of the catalyst. The carbonaceos residues on the surface of the catalyst cover the active catalyst sites and thus decrease activity. Accordingly, it becomes necessary to remove the carbonaceous deposits from the catalyst in order to return the catalyst to an economically viable activity level.

The first step in the regeneration sequence of the present invention consists of pretreating the carbonaceous residue-deactivated catalyst witha chlorine-containing reagent in an amount sufficient to increase the catalyst chlorine content (as chlorine or chloride) to form about 0.7 to 2.0 wt. %, preferably from about 0.8 to 1.5 wt. %, and most preferably from about 1.0 to 1.5 wt. %, based on anhydrous, carbonaceous residue-free catalyst. The manner in which the chlorine level of the catalyst is brought within the desired limits is not critical and may be carried out in a reducing or non-reducing medium or atmosphere. The chlorine-containing reagent can be introduced with the hydrocarbon feeds or hydrogen recycle gas during the operation of the process. Alternatively, the chlorine-containing reagent may be introduced in an appropriate gas stream into the reaction zone to provide the desired catalyst chlorine level after the catalyst is taken off-stream, that is, in the absence of hydrocarbon or haphtha feed stock. The gas may be an inert gas, such as flue gas, nitrogen, or a reformer tail gas. While the manner in which the chlorine-containing reagent is introduced into the reaction zone is not critical, it is important that the reagent be contacted with the deactivated catalyst prior to contacting the carbonaceous residue-deactivated catalyst with oxygen at temperatures normaly employed in regeneration, that is, temperatures in excess of about 775° F. Useful chlorine-containing reagents include elemental chlorine, hydrogen, chlorine-containing compounds or mixtures thereof. Useful chlrine-containing compounds are $C_1$–$C_4$ chlorinated hydrocarbons such as carbon tetrachloride, trichloroethylene, ethylene dichloride, t-butyl chloride, etc. Hydrogen chloride is the preferred chlorine-containing reagent. Although not necessarily gaseous at room temperature, such chlorine containing reagents will be gaseous at the conditions of the regeneration zone.

Ordinarily, it is desirable that the minimum possible amount of chlorine, within the above stated ranges, be used to secure the necessary protection of the catalyst during the burining operation. High chlorine catalyst loadings are normally undesiable because of the corrosion and handling problems encountered with the use of large amounts of chlorine or chlorine-containing compounds. Further, high chlorine loadings on the catalyst, in some instances, serves of flameproof the catalyst and retard the subsequent burning operation. It may be desirable to use high chlorine loadings when relatively high burning temperatures are employed to remove carbonaceous residues from the catalyst. For example, when burning temperatures in excess of about 850° F. are used, the catalyst should contain from about 1.3 to 2.0 wt. % chlorine, based on anhydrous, carbonaceous residue-free catalyst. When burning temperatures below about 850° F. are employed, chlorine loadings varying from about 0.7 to 1.3 wt. %, based on anhydrous, carbonaceous residue-free catalyst, are used.

Following the chlorine pretreating operation the reaction zone containing the iridium-containing catalyst may be purged with an inert gas to remove volatile hydrocarbons. This step may be omitted if the hydrocarbons have been purged from the reaction zone prior to or during the chlorine pretreating operation.

Thereafter, the carbonaceous residues are at least partially removed from the catalyst having a chlorine content of from 0.7 to 2.0 wt. %, based on anhydrous, carbonaceous residue-free catalyst, by contacting the same with a substantially sulfur-free gaseous mixture that contains minor amounts, i.e. from about 0.1 to 1 mole %, preferably from about 0.2 to 0.6 mole %, of oxygen while maintaining at least 0.7 wt. % chlorine in the catalyst. Preferably from about 0.8 to 1.5 wt. %, most preferably from about 1.0 to 1.5 wt.% chlorine (as chlorine or chloride) based on anhydrous, carbonaceous residue-free catalyst will be maintained on the catalyst during the carbonaceous residue burning operation. In order to maintain the required amount of chlorine on the catalyst throughout the burning operation, the catalyst can be treated, prior to contacting the carbonaceous residue-containing catalyst with said oxygen-containing gaseous mixture, with a chlorine-containing reagent in an amount sufficient to insure the presence of at least 0.7 wt. % chlorine on the catalyst.

Alternatively, the chlorine-containing reagent may be added to the oxygen-containing gas utilized in the burning operation in sufficient quantities to insure same. The concentration of halogen in the oxygen-containing gaseous mixture is relatively low, that is, the halogen comprises from about 0.005 to 5 volume %, preferably from about 0.02 to 1 volume % of the gaseous mixture. A combination of either method of chlorine addition is also contemplated. However, it is preferred to treat the catalyst with the chlorine-containing reagent, prior to the burning operation, with additional amounts of said reagent being added during the burning operation only as may be necessary to maintain at least 0.7 wt. % chlorine thereon.

Although a halogen may be present in the gaseous mixture employed in the burning operation, the treating gas is preferably substantially halogen-free and sulfur-free. By substantially halogen-free and sulfur-free is meant that the sulfur and halogen (elemental halogen and/or halogen containing compounds) level of the treating gas being introduced into the reaction zone containing the catalyst to be treated is less than about 20 ppm by volume halogen (as equivalent hydrogen halide) and less than about 20 ppm by volume of sulfur constituents (as equivalent hydrogen sulfide). As mentioned above, the halogen concentration, and for that matter the sulfur concentration, of the treating gas may be increased during the course of contact of the treating gas with the carbonaceous residue deactivated catalyst; however, it is preferred that the treating gas being introduced into the reaction zone containing the catalyst have halogen and sulfur contents below the limits expressed above. The treating gas may contain water in amounts varying from about 10 to 40,000 preferably 1000 to 20,000 ppm by volume.

The carbonaceous residue burning operation is conducted at a maximum temperature (flame front temperature) in the range of from about 775° to less than about 900° F., preferably at a maximum temperature in the range of, from above about 800° to about 850° F. It is preferred that the flame front temperature of the burning operation be as low as possible consistent with the objective of removing undesired carbonaceous residues from the catalyst; however, temperatures up to about 925° - 950° F. can be used if the catalyst contains relatively large amounts of chlorine, that is, greater than about 1.5 wt. % chlorine. The burning operation is typically conducted at pressures varying from about 15 to 200 p.s.i.g. The burning process is conducted for a period sufficient to remove at least a portion, preferably substantially all, of the carbonaceous residues present on the catalyst. Depending upon the initial amount of the carbonaceous residues on the catalyst, a burning period of from about 2 to 50, preferably 8 to 24 hours is sufficient to reduce the carbonaceous residue content of the treated catalyst to below about 0.4 wt. %, based on anhydrous catalyst. In a normal operation, the contacting of the catalyst with the oxygen-containing gas is continued until carbon dioxide formation essentially ceases. At this point substantially all of the carbonaceous residues have been removed from the catalyst.

Following the burning operation, it is desirable that the carbonaceous residue-depleted catalyst be contacted with a substantially oxygen-free, inert gas, preferably nitrogen, to remove from the reaction zone any carbon monoxide, carbon dioxide and oxygen remaining after the burning operation. Because of the presence of oxygen within the reaction zone, it is desirable that the purging operation be carried out at a temperature below the maximum flame front temperature used in the burning operation, preferably below about 750° F., most preferably below about 650° F. The purging operation can be achieved by sweeping nitrogen through the reaction zone containing the catalyst. Alternatively, the reaction zone may be pressured up to about 3 to 4 atmospheres with nitrogen and then depressurized.

Following the purging operation, if used, the catalyst is returned to use without subjecting the same to a halogen promoted redispersion operation. It has been discovered that by following the process of the present invention, only a minor portion, if any, of the iridium present on the support is converted to large crystallites of iridium and/or iridium oxide. The prechlorination operation apparently serves to protect the catalyst from agglomeration during the subsequent low temperature burning operation. Preferably, the carbonaceous residue-depleted catalyst from the burning operation and prior to contact with an oxygen-containing gas at a temperature in excess of about 900° F., preferably prior to contact with an oxygen-containing gas at a temperature in excess of about 775° F., is reduced by contact with a hydrogen-containing gas at a temperature varying from about 600° to 1000° F. and recontacted with the hydrocarbon feed stock employed in the hydrocarbon conversion operation being promoted with the iridium-containing catalyst. In the case of a naphtha hydroforming operation, the desired reduction may be accomplished during the initial on-stream operation of the process wherein the catalyst is brought into contact with both hydrogen and the naphtha feed stock. If desired, the catalyst may be sulfided by contact with a sulfur-containing reagent, such as hydrogen sulfide, prior to use.

DESCRIPTION OF THE PREFERRED EMBODIMENTS

The following examples illustrate further the regeneration process of the present invention.

EXAMPLE 1

Two tests were conducted to demonstrate the utility of the process of the present invention. In the test, a first catalyst (Catalyst A) comprising 0.3 wt. % iridium and 0.3 wt. % platinum on alumina and containing 30% agglomerated iridium was used to promote a naphtha reforming operation at severe conditions until the catalyst contained about 2.0 wt. % carbonaceous residues on the catalyst. Two days before discontinuing the contacting of the catalyst with naphtha, 50 w.p.p.m. of n-amyl chloride was admixed with the feed stock being introduced into the reaction zone containing Catalyst A. This served to increase the catalyst chlorine level to about 1.6 wt. %. Catalyst A was then taken off oil and contacted with an oxygen/nitrogen mixture in amounts sufficient to produce an 896° F. flame front temperature. The burning operation was carried out by packing 130 grams of Catalyst A into a 1-inch diameter tubular reactor that was positioned within an isothermal sand bath. The oxygen/nitrogen burning mixture was passed upwardly over the catalyst for about 2.75 hours at a pressure of about 100 p.s.i.g. After the burning operation was completed, the catalyst was found to contain about 1.13 wt. % chlorine, 1.2 wt. % carbonaceous residues and 30% agglomerated iridium.

In a parallel experiment, another 0.3 wt. % iridium/ 0.3 wt. % platinum on alumina catalyst that contained no iridium agglomeration (Catalyst B) was employed in a naphtha reforming operation under conditions similar to those employed with Catalyst A. The reforming operation was conducted until the catalyst contained about 5.2 wt. % carbonaceous residues. The catalyst was taken off oil and subjected to a substantially identical burning operation as was used in respect to Catalyst A. The catalyst was not pretreated with halogen and the catalyst chlorine content, prior to the burning operation, was 0.68 wt. %. After the burning operation, the catalyst contained 0.64 wt. % chlorine, 0.5 wt. % carbonaceous residues and 14% of the iridium was agglomerated.

The two experiments demonstrate clearly the efficacy of the process of the present invention. In the Catalyst A experiment no additional iridium agglomeration was experienced. In contrast, 14% of the iridium in Catalyst B was agglomerated in the burning operation where no prechlorination step was employed.

Percent agglomeration of the iridium present on Catalyst A and Catalyst B was determined using X-ray diffraction analysis techniques and is the sum of the percent agglomerated elemental iridium and percent agglomerated iridium oxide (detectable by X-ray diffraction methods) present on the catalyst. In each test, an X-ray diffraction pattern of the treated catalyst was obtained and the area under the elemental iridium peak and iridium oxide peak of the pattern was measured. Percent agglomerated iridium oxide present on the sample was then determined by dividing the iridium oxide peak surface area of the sample by the surface area of the iridium oxide peak of a completely agglomerated sample of the same catalyst (secured by heating the catalyst in air at 1400° F. for several hours). Percent agglomerated elemental iridium was determined by dividing the surface area of the sample elemental iridium peak by the surface area of the elemental iridium peak of a completely agglomerated sample of the same catalyst that was reduced in hydrogen at 1000° F. for several hours.

EXAMPLE 2

To demonstrate the utility of the process of the present invention, a long term naphtha reforming process test was carried out wherein the naphtha contacting was interrupted five times to remove accumulated carbonaceous residue deposits (coke) from the catalyst. In the test a catalyst comprising 0.3 wt. % iridium and 0.3 wt. % platinum on alumina was contacted with hydrogen and a virgin naphtha, having a true boiling point varying from 160° to 350° F., at 900° F. and 150 p.s. i.g. pressure. During the on-stream operation, three weight parts per million of n-amyl chloride, based on total feed stock, were introduced with the feed into the reaction zone containing the catalyst. Contacting of the catalyst with the naphtha feed stock was discontinued after the catalyst had been partially inactivated by coke deposition and after greater than about 0.8 wt. % chlorine had accumulated on the catalyst. After the naphtha feed stock was removed from the reaction zone, the catalyst was contacted with a gaseous mixture comprising nitrogen containing 0.3 mole % oxygen. The treating gas was introduced at a rate sufficient to maintain a flame front burning temperature varying between 800° and 820° F. Thereafter the catalyst was again contacted with the naphtha feed stock and the operation continued until the next burning cycle. In each burning cycle a portion of the catalyst was analyzed before and after the burning operation to determine the amount of chlorine and coke present. Further, using the Example 1 procedure, the catalyst was analyzed after each burning cycle to determine the extent of iridium agglomeration. The results of the tests are set forth in Table I.

TABLE I

| Burn No. | Burn Duration (hours) | Catalyst Analysis Before Burn | | Catalyst Analysis After Burn | | |
|---|---|---|---|---|---|---|
| | | Wt. % Cl | Wt. % Coke | Wt. % Cl. | Wt. % Coke | % Ir Agglomeration |
| 1 | 7.5 | 0.85 | 5.3 | 0.82 | 0.6 | 0 |
| 2 | 4.5 | 0.83 | 3.4 | 0.83 | 0.6 | 0 |
| 3 | 3 | 0.90 | 1.5 | 0.88 | 0.3 | 0 |
| 4 | 7.5 | 1.01 | 6.3 | 0.92 | 0.7 | 0 |
| 5 | 3.0 | 0.87 | 1.9 | 0.86 | 0.2 | 0 |

EXAMPLE 3

An additional series of tests were performed to further demonstrate the utility of the present invention. In each case, a 100-130 gram sample of catalyst containing accumulated carbonaceous residue deposits was placed into a 1-inch diameter tubular reactor that was positioned within an isothermal sand bath. A gas mixture containing nitrogen and 0.3 mole % oxygen was passed upwardly over the catalyst for varying periods of time at a pressure of about 100 p.s.i.g. and at a rate sufficient to maintain a flame front burning temperature in the range of from about 795° to about 825° F. In some tests, the gas mixture contained moisture and hydrogen chloride. Similarly, in some tests, a flow of the gas mixture was continued after the burn until the oxygen concentration at the outlet of the reactor approximated that of the inlet. After completion of the burning operation, samples of the catalyst were taken from various sections of the bed, some of which were analyzed to determine the amount of chlorine and coke present thereon. The extent of iridium agglomeration was determined by the procedure of Example 1. The results of the tests are shown in Table II.

Table II

| Run No. | T °F | Treat Time, Hours (1) | Gas Composition | | Catalyst Analysis Before Burn (2) | | Catalyst Analysis After Burn (3) | | % Ir Agglomerated |
|---|---|---|---|---|---|---|---|---|---|
| | | | ppm H$_2$O | ppm HCl | wt. % Cl | wt. % Coke | wt. % Cl | wt. % Coke | |
| 1 | 799 | 2.5/4.3 | — | — | 0.86/0.78 | 3.4/3.43 | 0.87/0.82 | 0.55/0.57 | 0 |
| 2 | 816 | 1.4/1.5 | — | — | 1.01/0.79 | 1.26/1.6 | 0.79/0.98 | 0.22/0.35 | 0 |
| 3 | 823 | 5.3/2.4 | — | — | 0.86/0.78 | 3.4/3.43 | 0.91/0.79 | 0.47/0.88 | 0 |
| 4 | 826 | 7.5/2.6 | 19900 | — | — | — | 1.1/1.08/1.04 | 0.11/0.22/0.59 | 0 |
| 5 | 816 | 0.9/1.9 | — | — | 0.85/0.89 | 1.87/1.88 | 0.84/0.86 | 0.2/0.25 | 0 |
| 6 | 815 | 5.5/0.6 | — | — | 0.74 | 4.94 | 0.73/0.75 | 0.6/0.88 | 0 |

Table II-continued

| Run No. | T °F | Treat Time, Hours (1) | Gas Composition ppm H$_2$O | ppm HCl | Catalyst Analysis Before Burn (2) wt. % Cl | wt. % Coke | Catalyst Analysis After Burn (3) wt. % Cl | wt. % Coke | % Ir Agglomerated |
|---|---|---|---|---|---|---|---|---|---|
| 7 | 807 | 5.6/1.7 | 13000 | 374 | 0.74 | 4.94 | 1.06/1.08 | 0.51/0.77 | 0 |
| 8 | 796 | 12.5 | 19200 | 630 | 0.74 | 4.94 | 0.83/0.84 | 0.24/0.19 | 16/10 |
| 9 | 819 | 4.4/64.4 | 19500 | 78 | 0.85 | 5.33 | 1.37/0.72 | 0.16/0.17 | 14/25 |
| 10 | 804 | 5.1/1.3 | — | — | 1.01 | 4.34 | 0.47/0.49 | 0.45/0.46 | 0/5 |
| 11 | 826 | 3.1/0.1 | 19900 | 125 | 0.85 | 5.33 | 0.76/0.7 | 0.25/0.26 | 16/26 |

Notes:
(1) The first number refers to the time required for the flame front to pass through the catalyst bed. The second number refers to the time required for the oxygen concentration at the reactor outlet to approximate that of the inlet. In Run 8, the treat time shown is the sum of both numbers.
(2) The catalyst employed in Runs 1-3 and 5 was obtained from other catalyst tests wherein the catalyst bed was sampled at 5 locations with sections 2 and 5 being analyzed.
(3) In Runs 1-3 and 5-11, the catalyst bed was sampled at 5 locations with sections 2 and 5 being analyzed. In Run 4, the catalyst bed was sampled at 6 locations, sections 2, 5 and 6 being analyzed.

As is evident from the data presented in Table I and Runs 1–7 to Table II, the present process serves to remove undesired carbonaceous residues from the iridium-containing catalyst without damaging, that is, without agglomerating, the high surface area iridium present on the catalyst provided at least 0.7, preferably 0.8 wt. % chlorine is maintained on the catalyst during the burning operation. In Runs 8–9 of Table II, exposure of the catalyst to extended treat times caused agglomeration of iridium. The moisture present in the gas mixture in Runs 8 and 9 also promoted iridium agglomeration. In Run 10, the low chlorine level on the catalyst following the burning operation resulted in agglomeration of the iridium.

What is claimed is:

1. In a process for the catalytic conversion of hydrocarbons wherein a hydrocarbon feed stock is contacted with a catalyst comprising from about 0.01 to about 3.0 wt. % of an iridium component contained on a refractory inorganic oxide support at conversion conditions, the catalyst having been at least partially deactivated during contact with said feed stock by the deposition of carbonaceous residues thereon, a method for regenerating said catalyst comprising:
    1. contacting said carbonaceous residue-containing catalyst, after being contacted with said hydrocarbon feed stock but prior to contact with oxygen at a temperature of greater than about 775° F., with a chlorine-containing reagent in an amount sufficient to increase and maintain the catalyst chlorine content to from 0.7 to 2.0 wt. %, based on anhydrous, carbonaceous residue-free catalyst, to inhibit the agglomeration of non-agglomerated iridium on said catalyst during the subsequent burn operation;
    2. contacting said chlorinated carbonaceous residue-containing catalyst with a substantially halogen-free and sulfur-free gaseous mixture containing oxygen at a maximum temperature of from about 775° to 900° F. for a time sufficient to burn a substantial portion of said carbonaceous residues from said catalyst while maintaining at least 0.7 wt. % chlorine on said catalyst during contact with said gas mixture; and
    3. contacting said carbonaceous residue-depleted catalyst from said step (2) with said hydrocarbon feed stock at hydrocarbon conversion conditions without having previously contacted said catalyst with an oxygen-containing gas at a temperature in excess of about 900° F.

2. The process of claim 1 wherein said chlorine-containing reagent is selected from the group consisting of chlorine, hydrogen chloride and mixtures thereof.

3. The process of claim 1 wherein said contacting of said chlorinated catalyst with said oxygen-containing gaseous mixture is conducted at a maximum temperature varying from about about 800° to about 850° F.

4. The process of claim 1 wherein the chlorine-containing reagent is employed in (1) in an amount sufficient to increase and maintain the catalyst chlorine content to from 0.8 to 2.0 wt. %.

5. In a process for the catalytic conversion of a naphtha feed stock wherein said naphtha feed stock and hydrogen are contacted with a catalyst comprising from about 0.01 to about 3.0 wt. % of an iridium component contained on a refractory inorganic oxide support at reforming conditions, the catalyst having been at least partially deactivated during contact with said naphtha feed stock by the deposition of carbonaceous residues thereon, a method for regenerating said catalyst comprising:
    1. contacting said carbonaceous residue-containing catalyst, after being contacted with said naphtha feed stock but prior to contact with oxygen at a temperature greater than about 775° F., with a chlorine-containing reagent in an amount sufficient to increase and maintain the catalyst chlorine content to from 0.8 to 1.5 wt. %, based on anhydrous, carbonaceous residue-free catalyst, to inhibit the agglomerated iridium on said catalyst during the subsequent burn operation;
    2. contacting said chlorinated carbonaceous residue-containing catalyst with a substantially halogen-free and sulfur-free gaseous mixture containing oxygen at a maximum temperature varying from about 775° to 900° F. for a time sufficient to burn a substantial portion of said carbonaceous residues from said catalyst while maintaining at least 0.7 wt. % chlorine on said catalyst during contact with said gas mixture; and
    3. contacting said carbonaceous residue-depleted catalyst from step (2) with said naphtha feed stock at reforming conditions without having previously contacted said catalyst with an oxygen-containing gas at a temperature in excess of about 900° F.

6. The process of claim 5 wherein said catalyst comprises from 0.1 to 1.0 wt. % iridium and 0.1 to 1.0 wt. % platinum.

7. The process of claim 5 wherein said contacting of said chlorinated catalyst with said oxygen-containing gaseous mixture is conducted at a maximum temperature of above about 800° to about 850° F.

8. The process of claim 5 wherein said catalyst chlorine content in (1) is increased to from about 1.0 to 1.5 wt. %, based on anhydrous, carbonaceous residue-free catalyst.

9. The process of claim 8 wherein said contacting of said chlorinated catalyst with said oxygen-containing gaseous mixture is conducted at a maximum temperature varying from above about 800° to about 850° F.

10. In a process for the catalyst conversion of a naphtha feed stock wherein said naphtha feed stock and hydrogen are contacted with a catalyst comprising from about 0.01 to about 3.0 wt. % of an irridium component and a chlorine component contained on a refractory inorganic oxide support at reforming conditions, the catalyst having been at least partially deactivated during contact with said naphtha feed stock by the deposition of carbonaceous residues thereon, a method for regenerating said catalyst comprising:
1. contacting said carbonaceous, residue-containing catalyst during contact with said naphtha feed stock with a chlorine-containing reagent in an amount sufficient to increase and maintain the catalyst chlorine content to from about 0.7 to 2.0 wt. %, based on anhydrous, carbonaceous residue-free catalyst, to inhibit the agglomeration of nonagglomerated irridium on the catalyst during the subsequent burn operation;
2. contacting said carbonaceous, residue-contaminated catalyst that contains from about 0.7 to 2.0 wt. % chlorine, based on anhydrous, carbonaceous residue-free catalyst, with a substantially halogen-free gaseous mixture containing oxygen at a maximum temperature of from about 775° to 900° F. for a time sufficient to burn a substantial portion of said carbonaceous residues from said catalyst while maintaining at least 0.7 wt. % chlorine on said catalyst during contact with said gas mixture; and
3. contacting said carbonaceous residue-depleted catalyst from step (2) with said naphtha feed stock and hydrogen at reforming conditions without having previously contacted said catalyst with an oxygen-containing gas at a temperature in excess of about 900° F.

11. The process of claim 10 wherein said contacting of said chlorinated catalyst with said oxygen-containing gas mixture is conducted at a maximum temperature varying from above about 800° to about 850° F.

12. The process of claim 10 wherein said catalyst chlorine content in (1) is increased to from about 1.0 to 1.5 wt. %, based on anhydrous, carbonaceous residue-free catalyst.

13. The process of claim 12 wherein said contacting of said chlorinated catalyst with said oxygen-containing gaseous mixture is conducted at a maximum temperature varying from above about 800° to about 850° F.

14. The process of claim 10 wherein the chlorine-containing reagent is employed in (1) in an amount sufficient to increase and maintain the catalyst chlorine content to from 0.8 to 2.0 wt. %.

15. In a process for the catalytic conversion of a naphtha feed stock wherein said naphtha feed stock and hydrogen are contacted with a catalyst comprising from 0.01 to 3.0 wt. % iridium and a chlorine component contained on a refractory inorganic oxide support at reforming conditions, the catalyst having been at least partially deactivating during contact with said naphtha feed stock by the deposition of carbonaceous residues thereon, a method for regenerating said catalyst comprising:
1. contacting said carbonaceous residue-containing catalyst in the absence of said naphtha feed stock but prior to contact with oxygen at a temperature of greater than about 775° F., with a chlorine-containing reagent in an amount sufficient to increase the catalyst chlorine content to from 0.7 to 2.0 wt. %, based on anhydrous, carbonaceous residue-free catalyst, to inhibit the agglomeration of nonagglomerated iridium on the catalyst during the subsequent burn operation;
2. contacting said carbonaceous, residue-contaminated catalyst that contains from about 0.7 to 2.0 wt. % chlorine, based on anhydrous, carbonaceous residue-free catalyst, with a substantially halogen-free and sulfur-free gaseous mixture containing oxygen at a maximum temperature of from about 775° to 900° F. for a time sufficient to burn at least a portion of said carbonaceous residue from said catalyst while maintaining at least 0.7 wt. % chlorine on said catalyst during contact with said gas mixture; and
3. contacting said carbonaceous residue-depleted cagalyst from step (2) with said naphtha feed stock and hydrogen at reforming conditions without having previously contacted said catalyst with an oxygen-containing gas at a temperature in excess of about 900° F.

16. The process of claim 15 wherein said contacting of said chlorinated catalyst with said oxygen-containing gas mixture is conducted at a maximum temperature varying from above about 800° to above 850° F.

17. The process of claim 15 wherein said catalyst chlorinecontent in (1) is increased to from about 1.0 to 1.5 wt. %, based on anhydrous, carbonaceous residue-free catalyst.

18. The process of claim 17 wherein said contacting of said chlorinated catalyst with said oxygen-containing gas mixture is conducted at a maximum temperature varying from above about 800° to about 850° F.

19. The process of claim 15 wherein the chlorine-containing reagent is employed in (1) in an amount sufficient to increase and maintain the catalyst chlorine content to from 0.8 to 2.0 wt. %.

* * * * *